(Model.)
3 Sheets—Sheet 1.
M. JACKER.
CUT-OFF MECHANISM.
No. 249,630.
Patented Nov. 15, 1881.
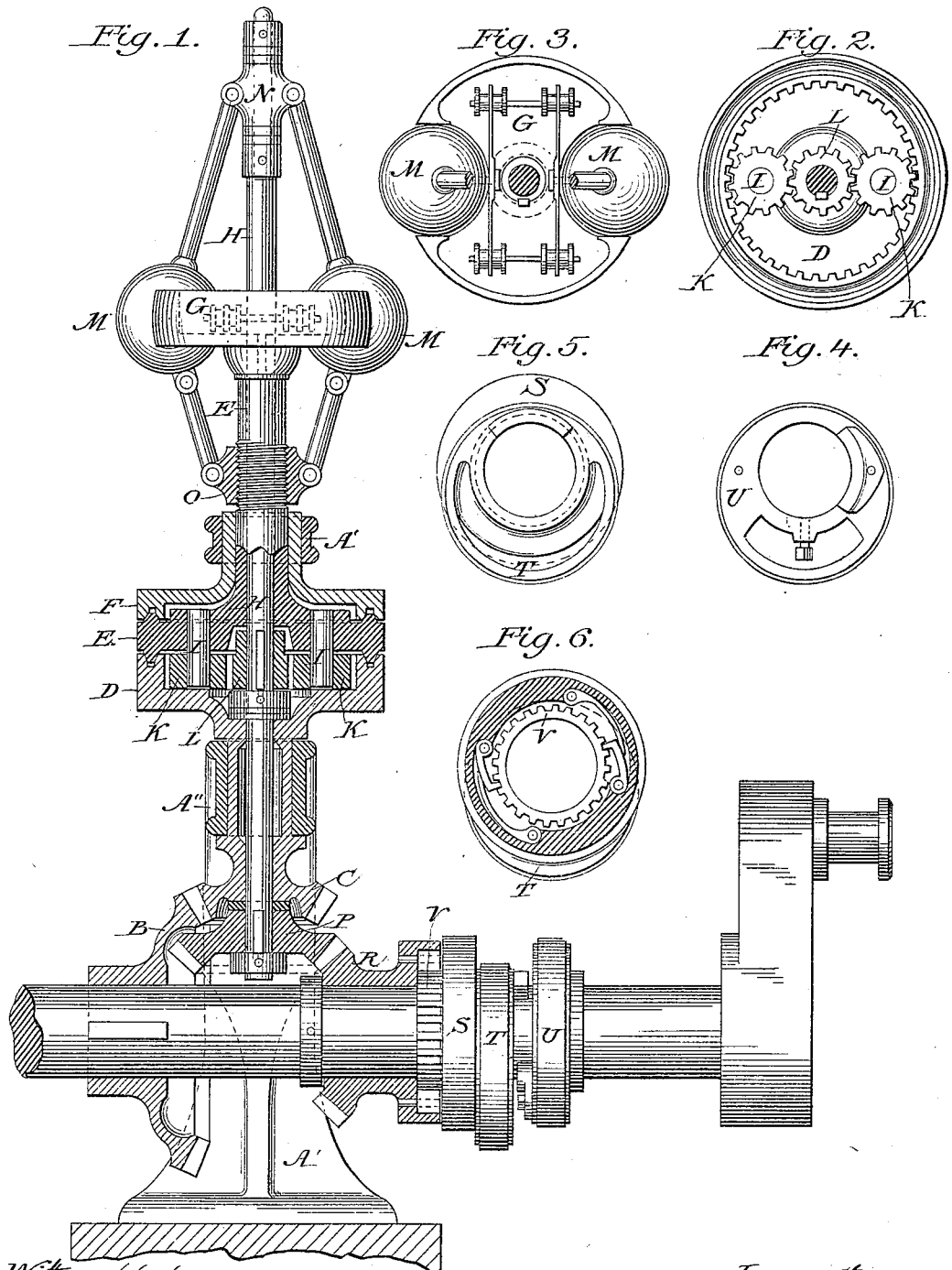
Witnesses:
Josephine Jacker
Emily Jacker
Inventor:
Maximilian Jacker

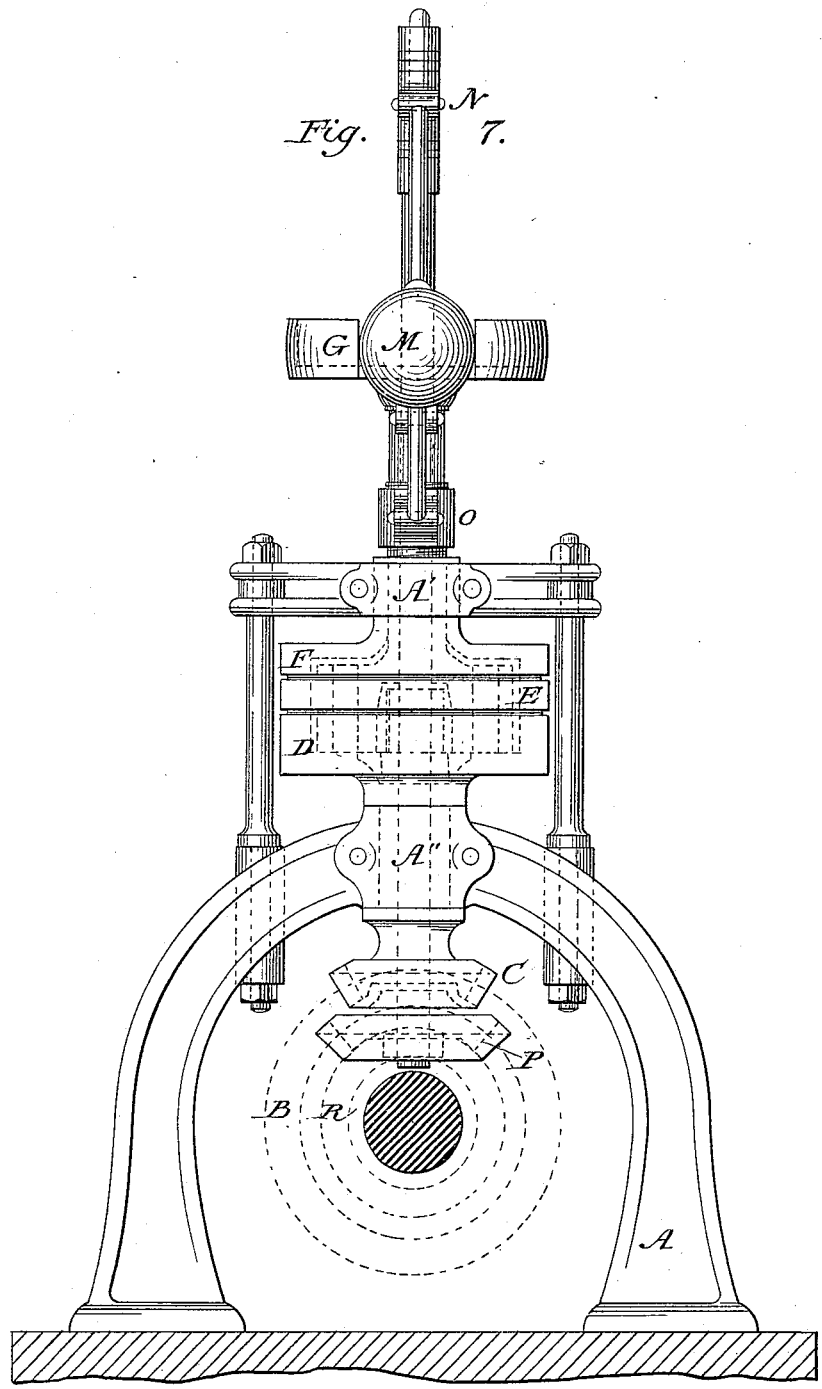

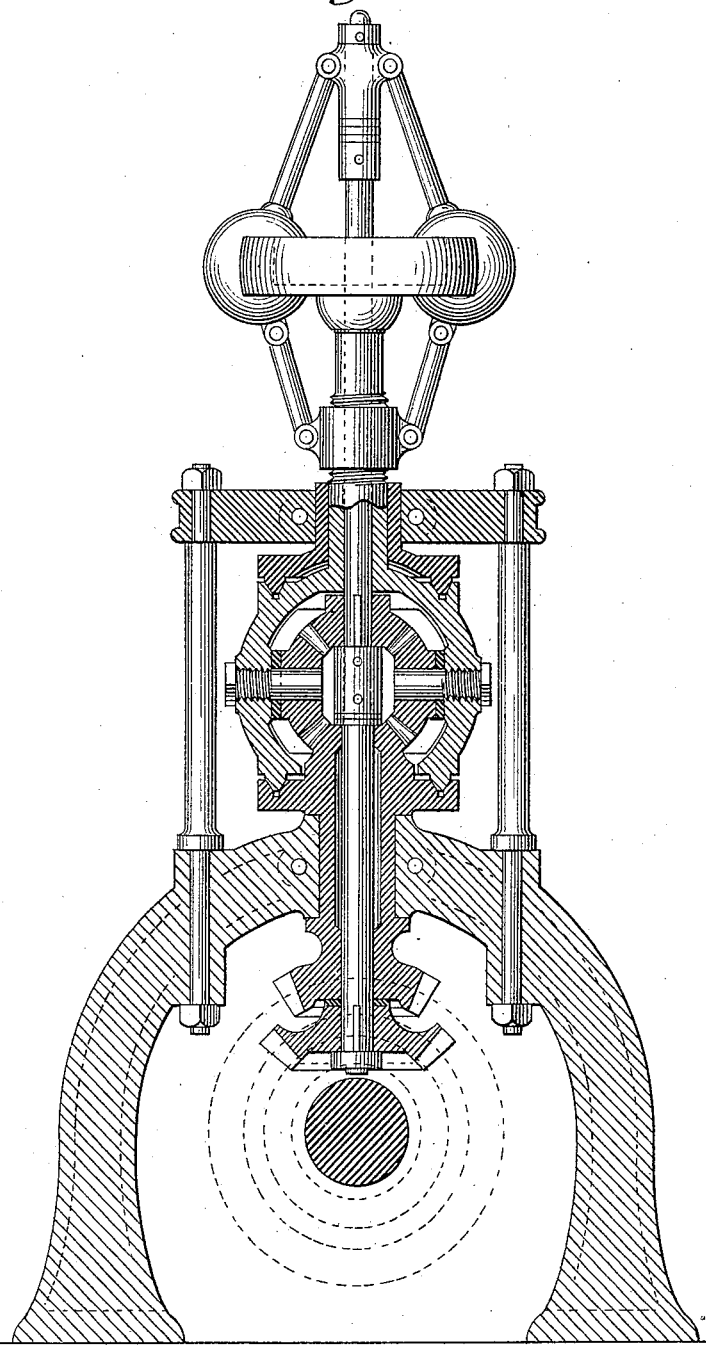

UNITED STATES PATENT OFFICE.

MAXIMILLIAN JACKER, OF MARQUETTE, MICHIGAN.

CUT-OFF MECHANISM.

SPECIFICATION forming part of Letters Patent No. 249,630, dated November 15, 1881.

Application filed May 20, 1881. (Model.)

*To all whom it may concern:*

Be it known that I, MAXIMILLIAN JACKER, of the city of Marquette, in the county of Marquette and State of Michigan, have invented a new and useful Improvement in Automatic Cut-Off Mechanism for Steam-Engines, of which the following is a specification.

The invention relates to automatic cut-off mechanism for steam-engines with direct or positive valve-motion.

The superior economy obtained by adjusting the degree of expansion automatically for every degree of resistance, instead of throttling down the supply of steam by a governor-valve, is at this time well understood and acknowledged by experts. The best results in this respect have been obtained thus far by the well-known Corliss engine by means of the drip-valve mechanism, which is, however, not a positive valve-motion.

It has been the object of many inventors to produce a good automatic cut-off engine with positive valve-motion, for the reason that all drip and release arrangements, with the necessary appendage of springs, weights, and dash-pots, are for practical purposes, to say the least of them, not desirable. There are several automatic cut-off engines with positive valve-motion in public use, but none of them can compete with the Corliss engine when economical effect, range of expansion, and regularity of motion are taken into consideration. It is the common practice to effect the adjustment of the cut-off through the vibrations of the governor-balls, using for this purpose the ordinary centrifugal governor or some equivalent centrifugal device. The vibrations of the governor-balls are caused by the variation of the engine's speed, and as a certain elevation or degree of vibration of the balls corresponds to every degree of cut-off or expansion produced, therefore it must be conceded that the engine's speed is accelerated for every higher degree of expansion, which is objectionable. When the cut-off is effected by the release of a detent, as done in the Corliss system, a small vibration of the governor-balls is sufficient to produce the desired effect, because the mechanism is very delicate and requires but little power for its action. Thus the engine's speed remains approximately normal; but when it is attempted to control the cut-off valve by a direct or positive connection with the governor under considerable variation of resistance the result is a variation of the engine's speed to such an extent as to make the engine unfit for many purposes. The reason is that it requires too much vibration of the governor-balls to do this work. The best automatic cut-off engines with positive valve-motion now in public use have only a limited range of cut-off. When the cut-off is made variable by lengthening and shortening the throw of the valve or by changing in any manner the amount of lap, then the range of variation cannot cover more than half the length of the piston-stroke, because with direct connection to a fixed eccentric the valve is bound to close the port within one-fourth of a rotation of the engine-shaft. To make the cut-off variable for the whole length of the piston-stroke by angular displacement of the eccentric, the latter must be shifted one hundred and eighty degrees, or half a rotation, which is too much for the ordinary governor or any centrifugal device depending for its action on variations of the speed if the engine's speed is expected to remain approximately normal.

My invention overcomes this difficulty entirely and produces by a novel arrangement an automatic cut-off with positive valve-motion, capable to cut the steam off at any point of the piston-stroke, and to secure a perfect normal engine speed under any resistance within the capacity of the engine with the throttle-valve wide open. Instead of controlling the cut-off by the vibrations of the governor-balls, I run my governor at a certain normal speed continually, and apply what difference occurs between the relative motion of engine and governor to control the cut-off. Using the normal governor only as a fulcrum, I change the angular position of the cut-off eccentric by differential gearing driven by the engine. The normal governor beats the time as regularly as the pendulum of a clock, and whenever the engine makes any part of a stroke out of time that very part of the motion is utilized for shifting the eccentric. The almost imperceptible vibrations of the governor-balls are here used to no other purpose but to keep up the normal speed of the governor, or rather to prevent the governor from running faster than a certain normal speed. In order to drive the governor at a normal speed, notwithstanding the unavoidable fluctuations in the speed of the motor, I have devised a simple and effective plan. I interpose a friction-disk between the driving-gear and governor in such a manner that a very small vibration of the balls will diminish or interrupt the contact with the driving-disk, and press the driver against a fixed disk, thus preventing the balls from rotating at a higher speed. After having thus established a normal speed for the governor, I have here in the governor the fulcrum for a lever to shift the eccentric automatically during the motion of the engine to any required position, and to keep it there as long as the speed of the engine remains normal. Every part of the rotary motion of the engine-shaft made out of time is applied to this lever, setting the eccentric forward or back to suit the resistance as the engine attempts to run faster or slower. This action is not produced by a simple lever, but by differential gearing, as hereinafter fully explained. For the distribution of steam I use two valves. The main valve is driven directly by a fixed eccentric, as usual, having a permanent lead and exhaust. The cut-off valve is driven through a separate eccentric by means of differential gearing in a novel manner, which, in combination with the normal governor, constitutes my invention. The eccentric for the main valve being fixed to the engine-shaft right close to the same, the cut-off eccentric is mounted loose on the shaft, resting with a projecting segment on a similar segment fast to the main eccentric, but capable of being turned forward one hundred and eighty degrees. When the cut-off eccentric rests on and is carried round by the main eccentric, then the valve cuts the steam off at the very end of the piston-stroke. When the eccentric is shifted forward one hundred and eighty degrees it cuts the steam off at the beginning of the stroke. As long as the engine runs too slow the cut-off eccentric remains in its first position and the steam-port remains open during the whole length of the piston-stroke. The eccentric may remain in that position when the engine runs at her normal speed; but just as soon as the engine makes the least part of a stroke too fast the cut-off eccentric is driven forward by differential gearing far enough to reduce the speed to the normal. The eccentric will continue to hold its new position as long as the engine's speed continues normal. Whenever the resistance to the engine decreases the eccentric is driven forward, and if the main driving-belt should break and the resistance be reduced to the mere friction of the engine, then the eccentric will at once run ahead and cut the steam off at the beginning of the next stroke, allowing just steam enough to enter the cylinder to keep up the normal speed of the engine. When the resistance to the engine increases at any time during the normal motion then the eccentric will fall back until it has reached a position where the amount of steam admitted into the cylinder is sufficient for a normal speed. Should the resistance become so great as to require the full power of the engine, then the cut-off eccentric will come back to rest on the main eccentric. The same will occur whenever the steam is throttled down. When the engine runs too slow for want of steam then the tendency of the gears would be to drive the eccentric back; and as this cannot be done after it has come to rest on the main eccentric it would evidently cause excessive friction on the driving-disk of the governor. To avoid this I interpose a clutch-wheel and driving-pawls between the gear and eccentric, so that the gear drives the eccentric forward only, but not backward, the resistance of the valve being quite sufficient to bring the eccentric back as soon as a slower motion of the gears permits it to fall back. To prevent any irregularity in the motion of the eccentric, I equalize the resistance of the valve and balance the eccentric by a counterpoise. I use a balanced cut-off valve and extend the valve-stem through both ends of the steam-chest to equalize the pressure of steam against the stem. For differential gears I prefer the internal gears, as they act very quickly; but other gears can be used for the same purpose. I use a balanced main valve and an independent seat for the cut-off valve; also, a balanced cut-off valve for larger engines. I have succeeded in constructing these valves in a simple and effective manner, and they have proved well after running over twelve months. For small engines, the valves need not be balanced, but the stem of the cut-off valve should always be extended through both ends of the steam-chest and the eccentric should be cast with counterpoise.

In the accompanying drawings the governor is shown placed right over the engine-shaft. This is not necessary, and for large engines a smaller shaft can carry the gears and eccentrics, thus reducing their size considerably. This shaft may be in line with the engine-shaft, and can be carried by the crank-pin by placing the steam-chest on the other side of the cylinder, which offers some incidental advantages.

I will now proceed to show the details of construction and explain more fully the operation of this invention by referring to the accompanying drawings.

Figure 1 is a side elevation and partial section, showing the normal governor, differential gears, and eccentrics. Fig. 2 shows the internal gears of the governor; Fig. 3, the upper part of the driver with adjustable springs and governor-balls; Fig. 4, the main eccentric with reversible segment for carrying the cut-off eccentric; Fig. 5, the cut-off eccentric with segment and counterpoise. Fig. 6 shows the clutch with reversible pawls and springs. Fig. 7 is an end elevation of the governor with internal gears. Fig. 8 shows miter-wheels substituted for the internal gears of the governor.

A' A" are two concentric bearings of the governor-stand A.

B and C are a pair of bevel-wheels drawn in the proportion of two to one, the larger one being keyed to the main shaft, the smaller one fast to the hollow shank of the driving-friction D, which rotates free and independent of the spindle H. The driving-friction D is provided with an internal gear or planet wheel, seen in Fig. 2.

E is the driver, which carries the governor-balls round by means of the disk G at its upper end. Its motion is likewise independent of the spindle H. Two opposite sectors of the driving-disk G embrace the governor-balls, leaving room for a slight vibration, as seen in Fig. 3. The governor-balls M M are suspended on the sleeve N, which is held in position on the stem or spindle H by collars and washers, but free to revolve independent of the spindle H. The governor-balls are also connected to the lower sleeve, O, which is screwed to the shank of driver E, so as to pull the driver upward when the balls diverge and to press down when the balls collapse.

F is the upper friction-disk, which is clamped fast to the bearing A', so that it cannot revolve, but may be adjusted to the proper distance to allow the driver E just to revolve free under it.

I I are two pins pressed into the driver E firmly.

K K are planet-gears revolving loose on the pins I I and transmitting motion from the wheel D to the center gear, L, which is fast to the spindle H. Right under this center gear is a collar fast to the spindle H resting on friction-washers in a recess of driver D. This collar bears the weight of the governor and is well supplied with oil.

P is a miter-wheel keyed to the lower end of the spindle H and secured by a nut or collar to resist the upward pressure of said spindle.

R is a loose sleeve with miter-wheel meshing into the miter-wheel P at one end and housing for clutch-pawls on the other end.

Fig. 6 shows the arrangement of the clutch. The clutch-wheel V is fast to the counterpoise S of the cut-off eccentric T, while the clutch-pawls are attached to and carried round by the housing and miter-wheel R, as seen at R and U, Fig. 1. Clutch-pawls and their springs are reversible, and can be changed to suit the direction in which the engine is intended to run. The pawls butt up against a solid shoulder in their housing, and are kept in position by pins. The governor-balls are drawn together by adjustable springs inside the driving-disk G. (Shown in Fig. 3.)

The operation is as follows: The weight of the driver E, assisted by the tension of the governor-springs, creates sufficient adhesion between the driving-disk D and the driver E to carry the governor round without slipping until the centrifugal force of the balls overbalances the tension of the springs and begins to lift the driver E from its seat on the driving-disk D. This action commences as soon as the governor has attained his normal speed. It is impossible to drive the governor faster, because any attempt to do so will cause the balls to diverge and press the driver against the fixed friction-disk F, and before it can reach this the adhesion to the driving-friction is entirely lost. The bevel-wheel B, being larger than the wheel C, drives the latter so fast that the governor will attain his normal speed long before the engine reaches her normal speed. Before the governor reaches his normal speed, while D and E are firmly pressed together, they are both running at the same speed. The planet-gears K K are then locked, and have no independent motion around their own axis. The center gear, L, is therefore carried round in the same direction and at the same speed with the driver D and governor. So is the spindle H with the miter-wheel P, driving the sleeve R, with the clutch-pawls in an opposite direction to that of the engine-shaft. The pawls will slip over the clutch-wheel without affecting the cut-off eccentric, which is carried round by the main eccentric. Steam is therefore admitted into the cylinder during the whole piston-stroke or until the main valve closes the port. The engine's speed being arbitrary, let the normal speed of the engine be eighty revolutions and the normal speed of the governor one hundred. When the engine makes fifty revolutions the governor will make one hundred, and has reached its normal speed, beyond which it cannot be driven. As the speed of the engine continues to increase the driving-friction D will begin to run ahead of the driver E, because the latter, being part of the governor, cannot run faster than one hundred revolutions. Now the planet-gears K K begin to act, rolling round the center gear, L, and the latter will gradually run slower as the speed of the engine increases. At a certain speed of the engine (sixty-six and two-thirds revolutions) the center gear will come to rest, and immediately after this it will begin to rotate in an opposite direction. Its speed will increase now with the engine's speed until, finally, when the engine reaches her normal speed at eighty revolutions, the rotation of the center gear, L, and those of the engine-shaft will become isochronous. Thus far the main eccentric has been carrying the cut-off eccentric round, and the cut-off valve has kept the port open during the whole length of the piston-stroke. This will continue until the engine attempts to run faster. The smallest fraction of a stroke made faster than the normal speed will with mathematical certainty destroy the isochronism in the motion of the governor-spindle and engine-shaft, and the center pinion will go forward at a faster speed, thus shifting the eccentric, which will commence to cut off the steam at an earlier part of the next piston-stroke, reducing the speed of the engine to the normal. The slightest variation of the resistance which affects the engine speed will disturb the isochronism in the motion of engine-shaft and governor-spindle, which can only exist during a perfectly normal engine speed. When the resistance decreases and the engine attemps to run faster, then the planet-wheel will drive the center gear and governor-spindle faster, causing the clutch to run the eccentric ahead. If the resistance increases the reverse action will be the result—that is, the center gear will be driven at a slower speed than the engine-shaft, and so will the eccentric, thus changing its angular position to the crank, so as to cut the steam off at a later part of the piston-stroke. This action can go on as the resistance increases to the full power of the engine. Then the cut-off eccentric will again come to bear against and will be driven by the main eccentric. Any additional increase of the resistance over and above the full power of the engine will, of course, reduce the speed below the normal; but the continuing retrograding motion of the gears cannot further affect the position of the eccentric, because the clutch-pawls will merely slip back over the teeth of the clutch-wheel. This will also occur when the steam is throttled down before stopping, and when the engine is gradually started up, but never while the engine is running under sufficient steam-pressure to keep up the normal speed. It might appear that the friction on the disks of this governor consumes considerable power, but a close examination of its action reveals the fact that as long as the engine speed is normal the pressure of the planet-gears K K against the pins I I is sufficient to drive the governor. There is only very little friction alternately on the upper or lower disk during the fluctuations in the engine's speed. When the engine runs too slow while starting up and before stopping, the friction on the disks is reduced to nothing, since the driving-friction and governor are then moving at the same speed together. The weight of the governor-balls must be adapted to the power necessary for driving the valve.

The speed of the engine can be adjusted by giving more or less tension to the governor-springs. When the engine, as aforesaid, runs at her normal speed the rotations of engine-shaft and governor-spindle are isochronous. Whenever the speed of the engine is accelerated or retarded this isochronism is destroyed, and to do this any imperceptible difference in speed is sufficient. As long as the isochronism exists the eccentric revolves at the same speed as the engine-shaft, thus retaining his angular position to the crank, whatever that position may be at the time. Just as soon as the isochronism is disturbed, and no matter how little this disturbance may be, the eccentric is shifted forward or back, according to the tendency of the engine to run faster or slower. The angular displacement of the eccentric is not a simple exponent of the disturbing element. It is a multiple of this element, and therefore the action is very sensitive and quick. The amount of steam which has been admitted into the cylinder at the beginning of the stroke is allowed to spend its force, but if that amount is too much or too little to drive the piston at the normal speed to the end of the stroke, then it will cause the eccentric to cut the steam off sooner or later after beginning of the next stroke with absolute certainty, the variation in the motion of the engine-shaft being in either case transferred to the eccentric and the amount of differential motion multiplied by the gearing.

It will be readily seen that the work of adjusting the cut-off is here not done by the governor, but by the engine. The vibrations of the governor-balls are not only imperceptible to the eye, but the degree of cut-off or expansion is quite independent of these vibrations. The adjustment of the cut-off is based on the normal motion of the governor; and since no variation of resistance within the power of the engine can influence or disturb the normal speed of the governor, therefore the number of revolutions of the engine-shaft will be precisely the same, whether the load carried by the engine is light or heavy. It is impossible for an engine with this cut-off to continue to run slower or faster, which is unavoidably the case with the ordinary governor when the initial steam-pressure or the resistance changes. Whenever the smallest variation in the engine speed creates an infinitely small difference in the relative speed of engine and governor the differential motion so created is without loss of time multiplied and directly transferred to the eccentric, correcting the admittance of steam for the next stroke. The result is great sensitiveness and a very regular motion of the engine.

Fig. 8 shows a different arrangement of frictions and gears, with miter-wheels substituted for the internal gears, which answers the same purpose by substantially the same means in another form. The action of the miter-wheels is not so quick, but sufficiently prompt for most purposes, and for small engines with light fly-wheels perhaps even preferable.

The relative proportion of the gears is to some extent arbitrary, depending on the speed required for the engine and that selected for the governor, the speed of the latter being preferably slow, in order to avoid excessive speed of gears. The duty required of the governor is merely a normal speed and sufficient resistance to serve as a fulcrum for driving the eccentric and valve, a slow motion of the governor being for this purpose sufficient.

The result obtained by this novel cut-off mechanism is practically the same as that produced by the complicated Corliss system. Here it is obtained by a positive valve-motion, dispensing with springs, weights, and dash-pots. The whole mechanism is composed of simple reliable parts, and consumes very little power.

It allows the use of plain slide-valves, which can be refitted anywhere by moderately-skilled machinists without expensive tools. It works well under any speed, the motion being non-intermittent and smooth. For keeping up a regular and normal speed under the greatest variations of resistance it has no equal. There are no auxiliary appendages. Every part is a positive working member and calculated for a long life. The cut-off valve requires no lap, and always closes the port at the moment when its linear motion is quickest. The closing of the port is therefore done during a very small part of the piston-stroke, avoiding wire drawing. The action of the cut-off valve, being positive and yet quick, cannot be excelled by the more or less uncertain action of a drip-valve.

What I claim as my invention is—

1. The combination of revolving and fixed friction-disks with a centrifugal governor in a manner that a very slight vibration of the balls will, when the governor attains a certain speed, suspend adhesion to the driving friction-disk and cause friction on the fixed disk, thus maintaining a steady normal speed for the governor, which does not increase during the subsequent higher speed of the motor, substantially as and for the purpose specified.

2. The combination of a planet-wheel or its equivalent with the driving friction-disk in one piece or firmly connected with the same, with intermediate gears fulcrumed on a part of the governor having a steady normal speed or motion, with a driven gear keyed to the central spindle or arbor which transmits motion to the cut-off eccentric, so that after the governor has attained his normal speed the increasing speed of the planet-wheel or its equivalent will be communicated to the central arbor, driving the same in an opposite direction at a rapidly-increasing speed until the motion of said arbor and the motion of the engine-shaft become isochronous and remain so during the normal speed of the engine, while the slightest fluctuation in the motion or speed of the engine will destroy this isochronism, and will thereby change the position of the cut-off eccentric, which is mounted loose on the engine-shaft, thus adjusting the lead of the cut-off valve and regulating the degree of expansion automatically for every degree of resistance by a positive connection with non-intermittent motion.

3. In combination with the governor, differential gearing, and cut-off eccentric, a clutch or ratchet interposed between gears and eccentric, so that a direct motion is transmitted from the gearing to the eccentric only in one direction, allowing the cut-off eccentric to be carried by a projection on the main eccentric independent of the differential gearing during a slow motion of the engine, the position of the cut-off eccentric in the latter case being such that steam will follow the piston during the whole length of the stroke at full pressure, while the eccentric is yet capable of being shifted by the gearing far enough to cut the steam off at the beginning or at any point of the piston-stroke, substantially as explained.

MAXIMILLIAN JACKER.

Witnesses:
JOSEPHINE JACKER,
EMILY JACKER.